US009600165B2

(12) United States Patent
Albouyeh et al.

(10) Patent No.: US 9,600,165 B2
(45) Date of Patent: *Mar. 21, 2017

(54) EVALUATING PORTIONS OF CONTENT IN AN ONLINE COMMUNITY

(71) Applicant: INTERNATIONAL BUSINESS MACHINES CORPORATION, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,207

(22) Filed: Feb. 20, 2015

(65) Prior Publication Data

US 2015/0293682 A1    Oct. 15, 2015

Related U.S. Application Data

(63) Continuation of application No. 14/252,796, filed on Apr. 15, 2014.

(51) Int. Cl.
*G06F 17/30* (2006.01)
*G06F 3/0484* (2013.01)

(52) U.S. Cl.
CPC ...... *G06F 3/04847* (2013.01); *G06F 3/04842* (2013.01); *G06F 17/3053* (2013.01); *G06F 17/30864* (2013.01); *G06F 17/30905* (2013.01)

(58) Field of Classification Search
CPC ............ G06Q 30/0263; G06Q 30/0278; G06F 17/30477; G06F 17/30528; G06F 17/30554;

(Continued)

(56) References Cited

U.S. PATENT DOCUMENTS 7,958,119 B2 *  6/2011  Eggink ............. G06F 17/30702
                                                          707/732
8,463,595 B1 *  6/2013  Rehling ........... G06F 17/30864
                                                          704/9

(Continued)

OTHER PUBLICATIONS

List of IBM Patents or Patent Applications Treated as Related.

*Primary Examiner* — Thanh-Ha Dang
(74) *Attorney, Agent, or Firm* — The Steadman Law Firm PLLC

(57) ABSTRACT

An approach is described for evaluating portions of content in an online community. An associated method may include displaying a content post in an online community interface and, upon detecting a selection of an option in the online community interface to evaluate the content post, requesting a selection of one or more portions of the content post and an evaluation of the selected one or more portions. Requesting such evaluation may include requesting selection of a favorability score on a predefined scale for each of the selected one or more portions. Previously evaluated portions or portions predetermined via natural language processing or audiovisual processing may be displayed to facilitate evaluation of the content post. The method further may include, upon receiving a selection of one or more portions and an evaluation of the selected one or more portions, updating display of the content post to reflect the evaluation.

13 Claims, 12 Drawing Sheets

(58) Field of Classification Search
CPC ............ G06F 3/04847; G06F 3/04842; G06F 17/3053; G06F 17/30864; G06F 17/30905; H04N 21/4756; H04L 67/02
USPC ........................................................ 707/737
See application file for complete search history.

(56) References Cited

U.S. PATENT DOCUMENTS

| | | | | |
|---|---|---|---|---|
| 8,751,917 | B2* | 6/2014 | Dhawan | G06Q 10/101 707/732 |
| 8,996,625 | B1 | 3/2015 | Singleton et al. | |
| 9,020,956 | B1* | 4/2015 | Barr | G06F 17/30864 707/748 |
| 9,183,259 | B1* | 11/2015 | Marra | G06F 17/3053 |
| 9,208,444 | B1 | 12/2015 | Zheng et al. | |
| 2008/0147483 | A1* | 6/2008 | Ji | G06Q 10/10 705/7.32 |
| 2009/0063379 | A1* | 3/2009 | Kelly | G06Q 30/02 706/46 |
| 2009/0299824 | A1* | 12/2009 | Barnes, Jr. | G06F 3/04847 705/7.39 |
| 2010/0100536 | A1* | 4/2010 | Chamberlain | G06F 17/30864 707/706 |
| 2010/0223157 | A1* | 9/2010 | Kalsi | G06Q 30/0601 705/26.1 |
| 2011/0022602 | A1* | 1/2011 | Luo | G06Q 10/10 707/748 |
| 2011/0179385 | A1 | 7/2011 | Li et al. | |
| 2012/0005221 | A1 | 1/2012 | Ickman et al. | |
| 2012/0136937 | A1 | 5/2012 | Fischer et al. | |
| 2012/0166457 | A1 | 6/2012 | Ross et al. | |
| 2012/0201362 | A1 | 8/2012 | Crossan et al. | |
| 2012/0209841 | A1 | 8/2012 | Saretto et al. | |
| 2012/0239763 | A1* | 9/2012 | Musil | G06Q 50/01 709/206 |
| 2013/0139048 | A1 | 5/2013 | Dhawan et al. | |
| 2013/0246518 | A1 | 9/2013 | Nace | |
| 2013/0304818 | A1 | 11/2013 | Brumleve et al. | |
| 2014/0068459 | A1* | 3/2014 | Graham | G06Q 50/01 715/753 |
| 2014/0095598 | A1* | 4/2014 | Schornack | G06Q 10/101 709/204 |
| 2014/0172638 | A1* | 6/2014 | El-Hmayssi | G06Q 30/0613 705/26.41 |
| 2015/0046371 | A1* | 2/2015 | Leary | G06F 17/274 705/347 |
| 2015/0100377 | A1 | 4/2015 | Penumaka et al. | |
| 2015/0112753 | A1* | 4/2015 | Suvarna | G06Q 50/01 705/7.29 |
| 2015/0278367 | A1* | 10/2015 | Chang | G06F 17/30867 707/723 |
| 2015/0286977 | A1* | 10/2015 | Schneeman | G06Q 10/06393 705/7.39 |
| 2015/0326622 | A1* | 11/2015 | Carter | H04L 65/403 715/753 |

\* cited by examiner

EVALUATING PORTIONS OF CONTENT IN AN ONLINE COMMUNITY

BACKGROUND

The various embodiments described herein generally relate to content evaluation in an online community. More specifically, the various embodiments describe techniques of evaluating portions of content in an online community.

Participants in an online community often submit content to be posted for review and evaluation by other participants. Such online community may include one or more of a social network, an electronic marketplace, a discussion forum, or a weblog. A content post in such online community may include multiple aspects reflecting diverse topics, views, or interests. Online community participants may view certain aspects of such a post favorably while viewing other aspects of the post less favorably or unfavorably. While conventional online communities enable participants to evaluate posts, such communities generally focus upon evaluations of entire posts and do not enable participants to evaluate portions of posts separately and distinctly. An evaluation submitted for an entire post by a client associated with an online community may not accurately reflect client views of each aspect of the post. Furthermore, the client may refrain from evaluating an entire post, since the client may be unable to adequately attribute favor to relatively favorable portions of the post while attributing neutrality or disfavor to relatively less favorable portions of the post.

For instance, a content post by an online community participant may indicate a like of Product A and further may indicate a dislike of Product B. Assuming that the client likes both Product A and Product B, the client may not be able to submit an appropriate evaluation of the post if the client can only indicate favor or disfavor with respect to the entire post. Consequently, the client in such context may feel compelled to submit an evaluation that is inaccurate with respect at least one portion of the post or may refrain from submitting an evaluation despite having a desire or need to do so.

SUMMARY

The various embodiments of the invention provide techniques for evaluating portions of posted content in an online community. An associated method may include displaying a content post in an online community interface. The online community may include at least one of a discussion forum, a social network, a product marketplace, and a weblog. The content post may include at least one of a textual element, a photograph, and an audiovisual element. The method further may include, upon detecting a selection of an option in the online community interface to evaluate the content post, requesting a selection of one or more portions of the content post, and requesting an evaluation of the selected one or more portions. Additionally, the method may include, upon receiving a selection of one or more portions and an evaluation of the selected one or more portions, updating display of the content post to reflect the evaluation.

In an embodiment, the method step of requesting an evaluation of the selected one or more portions may include requesting selection of a favorability score on a predefined scale for each of the selected one or more portions. In a further embodiment, the method step of updating display of the content post to reflect the evaluation may include determining respective average favorability scores for each of the selected one or more portions based on the evaluation and displaying in the online community interface indicia reflecting the respective average favorability scores determined for the selected one or more portions. In a further embodiment, the method step of updating display of the content post to reflect the evaluation may include determining a total average favorability score for the content post based on the evaluation and displaying in the online community interface the total average favorability score determined for the content post.

According to a further embodiment, the method step of requesting a selection of one or more portions of the content post may include, upon detecting a selection of an option in the online community interface to display previously evaluated portions of the content post, displaying one or more previously evaluated portions including indicia reflecting respective previous average favorability scores for the one or more previously evaluated portions. Additionally, such method step may include, upon detecting selection of an option in the online community interface to display previous evaluation attributes, displaying attributes regarding evaluations of online community participants with respect to at least one of the one or more previously evaluated portions. Such method step further may include, upon detecting selection of an option in the online community interface to display only previously evaluated portions having a previous average favorability score greater than a designated value, modifying display of the one or more previously evaluated portions to present only the previously evaluated portions having a previous average favorability score greater than the designated value.

According to a further embodiment, the method step of requesting a selection of one or more portions of the content post may include sending the content post to a content processing application and receiving from the content processing application one or more predetermined portions of the content post. The one or more predetermined portions of the content post may be generated via at least one of natural language processing and audiovisual processing. Such method step further may include displaying in the online community interface the one or more predetermined portions of the content post.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing a content management application program, which, when executed on the processor, performs one or more steps of the above recited method.

BRIEF DESCRIPTION OF THE SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
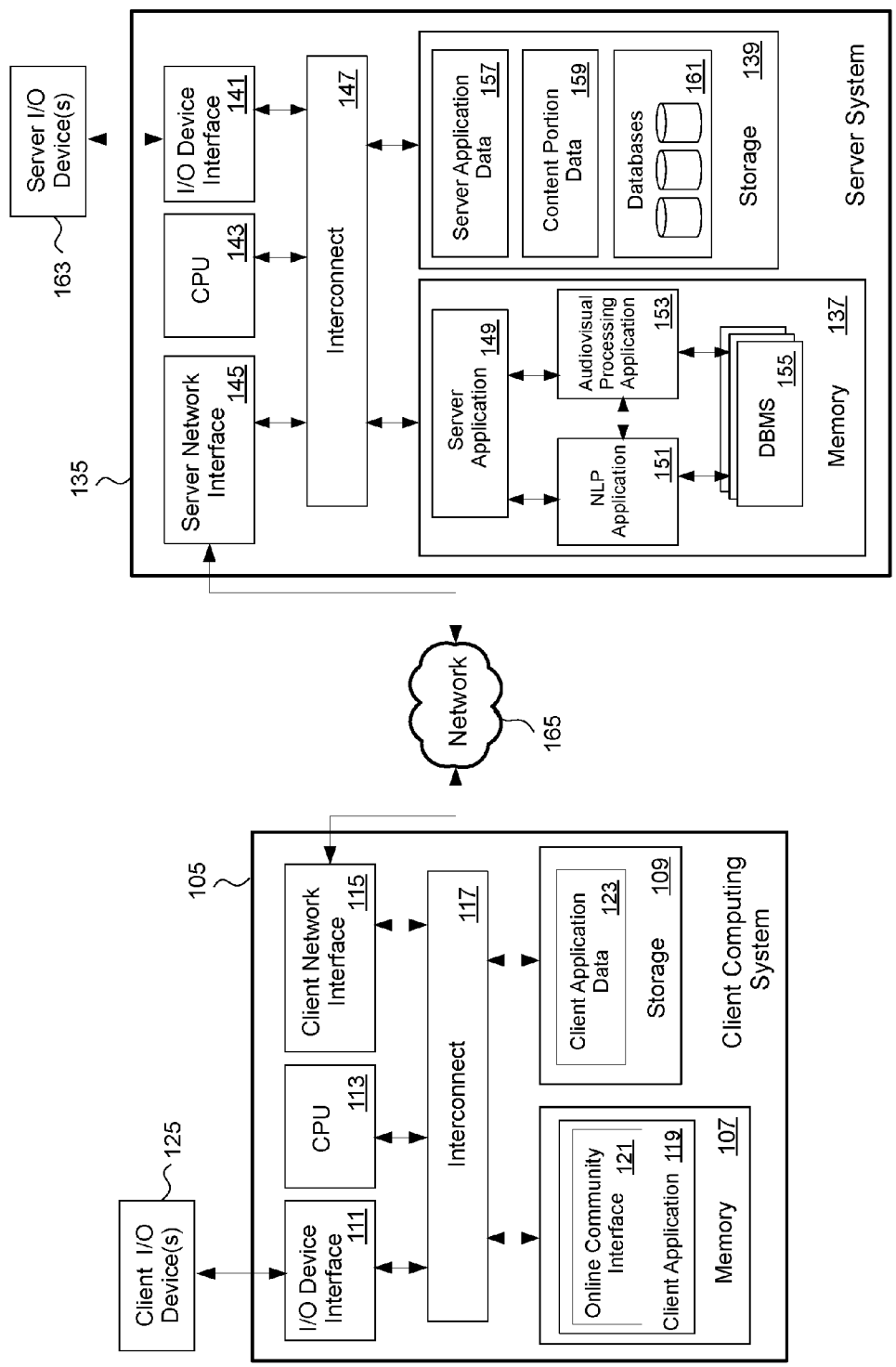
FIG. 1 illustrates a computing infrastructure, according to an embodiment.

The various embodiments described herein are directed to techniques for evaluating portions of content in an online community. In the context of this disclosure, a content post may be an element of content submitted by a participant for review and evaluation by other participants within an online community. Additionally, an online community may include at least one of a discussion forum, a social network, a product marketplace, and a weblog. Furthermore, a content post may include at least one of a textual element, a photograph, and an audiovisual element.

A client application of a client computing system may display a content post in an online community interface. Upon detecting a selection of an option in the online community interface to evaluate the content post, the client application may request a selection of one or more portions of the content post and an evaluation of the selected one or more portions. The client application may request evaluation of the selected one or more portions in the form of a favorability score on a predefined scale.

According to an embodiment, the client application may display previously evaluated portions to facilitate evaluation of the content post. The client application may display the previously evaluated portions upon detecting a selection of a corresponding option in the online community interface. The previously evaluated portions may include indicia reflecting respective previous average favorability scores for each of the one or more previously evaluated portions. Furthermore, the client application may display attributes with respect to the previously evaluated portions or may modify display of the previously evaluated portions to present only portions having a previous average favorability score greater than a designated value. The client application may take such display actions upon detecting a selection of respective corresponding options in the online community interface. According to a further embodiment, the client application may display one or more predetermined portions of the content post. In such embodiment, the one or more predetermined portions may be generated via natural language processing or audiovisual processing.

Upon receiving a selection of one or more portions of the content post and an evaluation of the selected one or more portions, the client application may update display of the content post to reflect the evaluation. Specifically, the client application may display in the online community interface indicia reflecting the evaluation. Furthermore, the online community interface may display attributes with respect to the evaluation, including a respective average favorability score for each of the selected one or more portions and a total average favorability score.

The various embodiments described herein may have advantages over conventional techniques of evaluating content in an online community. Specifically, the various embodiments described herein may permit separate and distinct evaluation of one or more portions of a content post. Accordingly, an online community client may attribute favor to favorable portions of such post while attributing neutrality or disfavor to less favorable or unfavorable portions of such post.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for evaluating portions of posted content in an online community. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. As shown, computing infrastructure 100 includes a client computing system 105 and a server system 135, each connected to a communications network 165. Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. I/O device interface 111 may be communicatively coupled to one or more client I/O devices 125. CPU 113 is included to be representative of a single CPU, multiple CPUs, a single CPU having multiple processing cores, and the like. Client network interface 115 may receive data from and transmit data to server system 135 via network 165.

Memory 107 may include a client application 119 that enables client computing system 105 to interface with an online community. Client application 119 may include an online community interface 121. Depending on the characteristics of the relevant online community, online community interface 121 may be one or more of a social networking interface, an electronic marketplace interface, an interface to a discussion forum, or an interface to a weblog. Storage 109 may include client application data 123 associated with client application 119.

Server system 135 may include a memory 137, storage 139, I/O device interface 141, a CPU 143, and a server network interface 145, all of which may be interconnected via interconnect 147 (e.g., a bus). Memory 137 may include a server application 149, a natural language processing (NLP) application 151, an audiovisual processing application 153, and a database management system (DBMS) 155. DBMS 155 is included be representative of a single database system or multiple database systems. Storage 139 may include server application data 157, content portion data 159, and databases 161. Databases 161 may include one or more relational databases. While FIG. 1 illustrates three databases 161, computing infrastructure 100 may include any number of databases. According to an embodiment, DBMS 155 may send requests to remote databases (not shown) via network 165.

Server application 149 may generate and process server application data 157 based on interaction with client computing system 105. To address requests of client computing system 105, server application 149 may send such requests to NLP application 151 or to audiovisual processing application 153. NLP application 151 may receive any textual element of a content post from client application 119 via server application 149 and may generate content portion data 159 from such textual element. According to one embodiment, audiovisual processing application 153 may receive any audiovisual element of a content post from client application 119 via server application 149 and may transcribe audio or video data from such audiovisual element into text and subsequently may send the transcribed text to NLP application 151 for further processing. According to a further embodiment, audiovisual processing application 153 may process any audiovisual element to directly generate content portion data 159. According to a further embodiment, audiovisual processing application 153 may generate content portion data 159 from photographic data received from client application 119 via server application 149. To facilitate generation of content portion data 159, NLP application 151 or audiovisual processing application 153 may send database requests to DBMS 155. DBMS 155 may include a software application configured to manage databases 161.

I/O device interface 141 may be communicatively coupled to one or more server I/O devices 163. CPU 143 is included to be representative of a single CPU, multiple CPUs, a single CPU having multiple processing cores, and the like. Server network interface 145 may receive data from and transmit data to client computing system 105 via network 165. Specifically, server application 149 may accept requests sent by client computing system 105 to server system 135 and may transmit data to client computing system 105 via server network interface 145.

Figure 2:
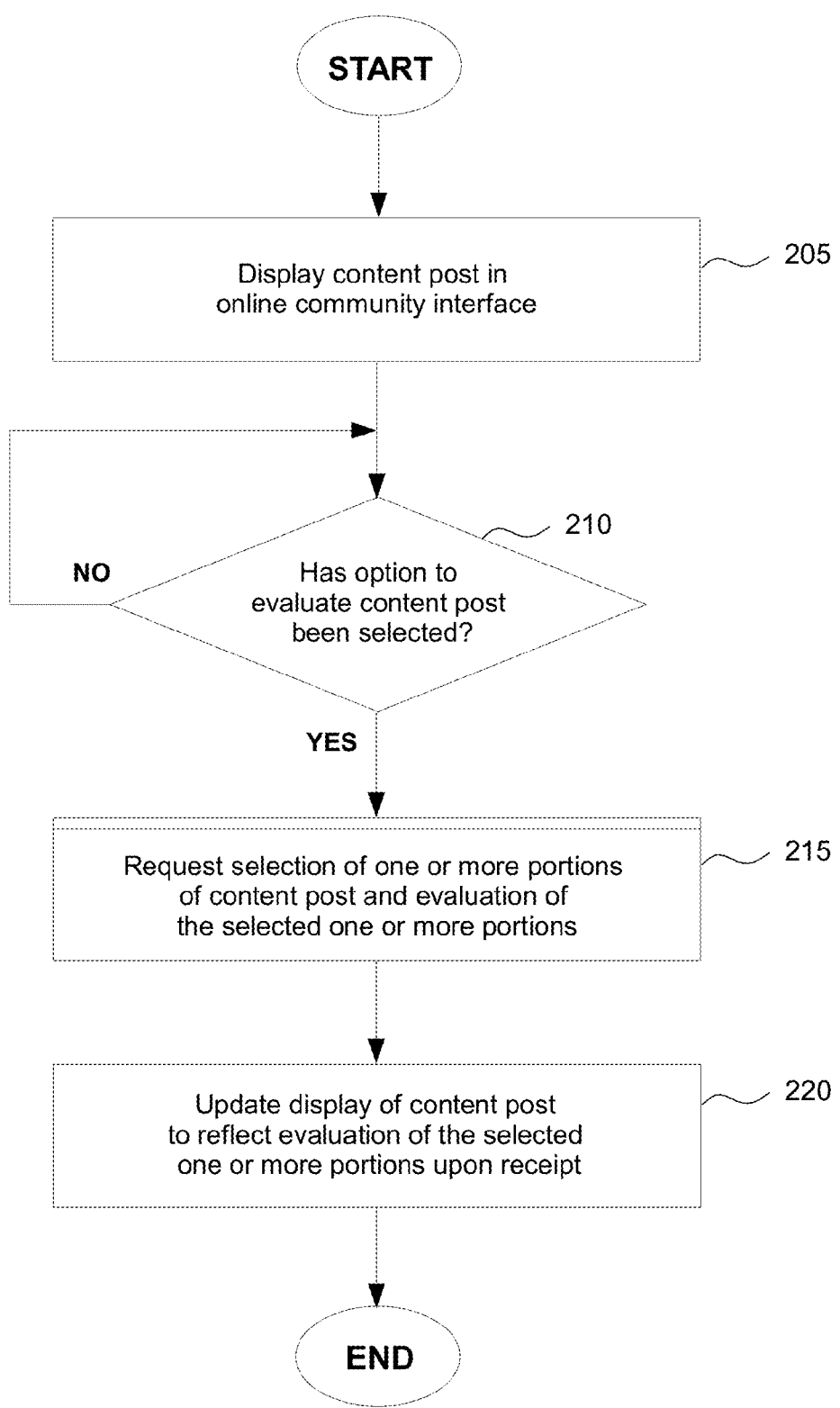
FIG. 2 illustrates a method of evaluating portions of a content post in an online community, according to an embodiment.

FIG. 2 illustrates a method 200 of evaluating portions of a content post in an online community, according to an embodiment. The online community may include at least one of a discussion forum, a social network, a product marketplace, and a weblog. Additionally, the online community may include any other online entity involving a group of participants. The content post may include at least one of a textual element (e.g., having typed or written text), a photograph, and an audiovisual element (e.g., an audio or video sample). A client application (e.g., client application 119) running on a client computing system (e.g., client computing system 105) may request evaluation of portions of the content post according to the method 200. Furthermore, according to the method 200, the client application may display the evaluated portions in an online community interface of a client (e.g., online community interface 121). For purposes of this disclosure, a user of the client computing system is referred to as a client.

The method 200 may begin at step 205, where the client application may display the content post in the online community interface. The client application may present in the online community interface one or more options selectable by the client, including an option to evaluate the content post. Moreover, the online community interface may include one or more additional options not specifically discussed herein. At step 210, the client application may determine whether the option in the online community interface to evaluate the content post has been selected. Upon detecting a selection of an option in the online community interface to evaluate the content post, at step 215 the client application may request that the client select one or more portions of the content post and further may request an evaluation of the selected one or more portions. Specifically, for a textual element included in the content post, the client application may request selection and evaluation of language elements within the textual submission. For a photograph included in the content post, the client application may request selection and evaluation of sections of the photograph. For instance, the client application may enable selection of quadrants of a photograph or may enable selection of one or more individuals within a pictured group. For an audiovisual element included in the content post, the client application may request selection and evaluation of sections of the element. For instance, the client application may enable selection of portions (e.g., frames) of a video recording or an audio recording.

According to an embodiment, the client application may request an evaluation of the selected one or more portions by requesting selection of a favorability score on a predefined scale for each of the selected one or more portions. The predefined scale may include two or more scores indicating two or more respective favorability levels. For instance, the predefined scale may include six scores, "0" through "5", with a score of "0" indicating lowest favorability, a score of "1" indicating low favorability, a score of "2" indicating moderately low to neutral favorability, a score of "3" indicating neutral to moderately high favorability, a score of "4" indicating high favorability, and a score of "5" indicating highest favorability. In a further instance, the predefined scale may include three scores, "0" through "2", with a score of "0" indicating low favorability, a score of "1" indicating neutral favorability, and a score of "2" indicating high favorability. In a further instance, the predefined scale may include two scores, "0" and "1", with a score of "0" indicating low favorability and a score of "1" indicating high favorability.

Figure 3:
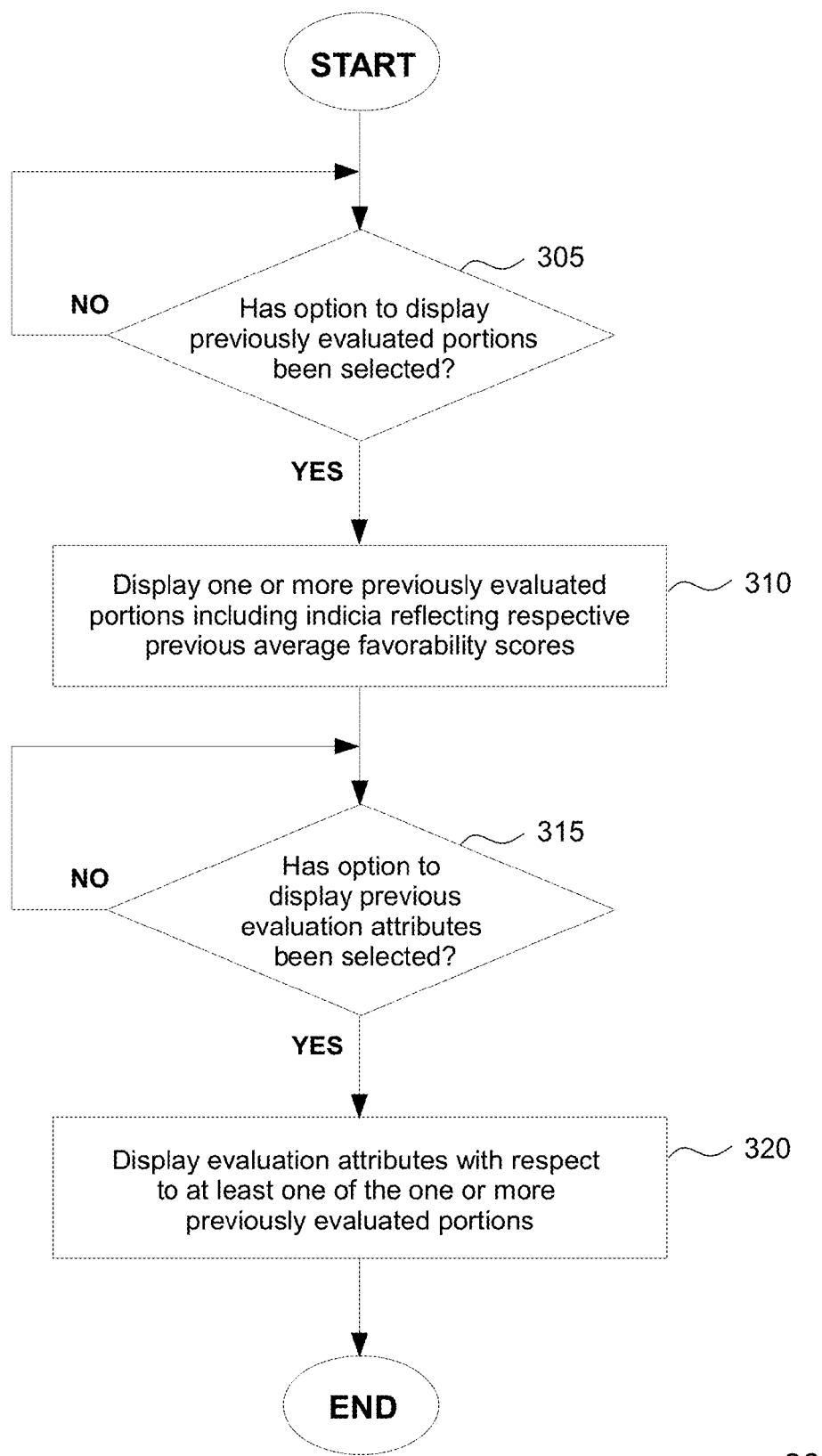
FIG. 3 illustrates a method of requesting a selection of one or more portions of the content post, according to an embodiment.
Figure 4:
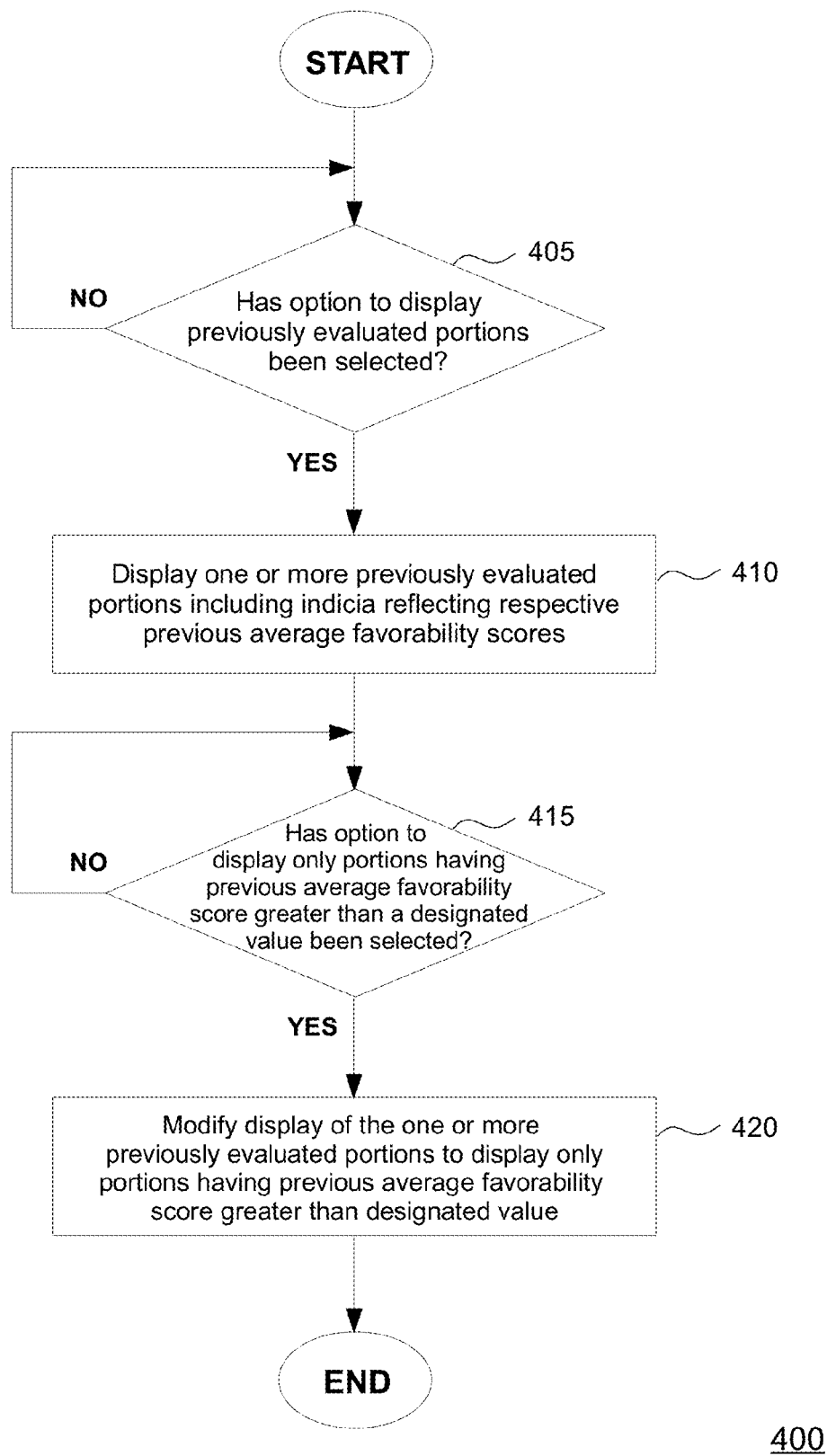
FIG. 4 illustrates a method of requesting a selection of one or more portions of the content post, according to a further embodiment.
Figure 5:
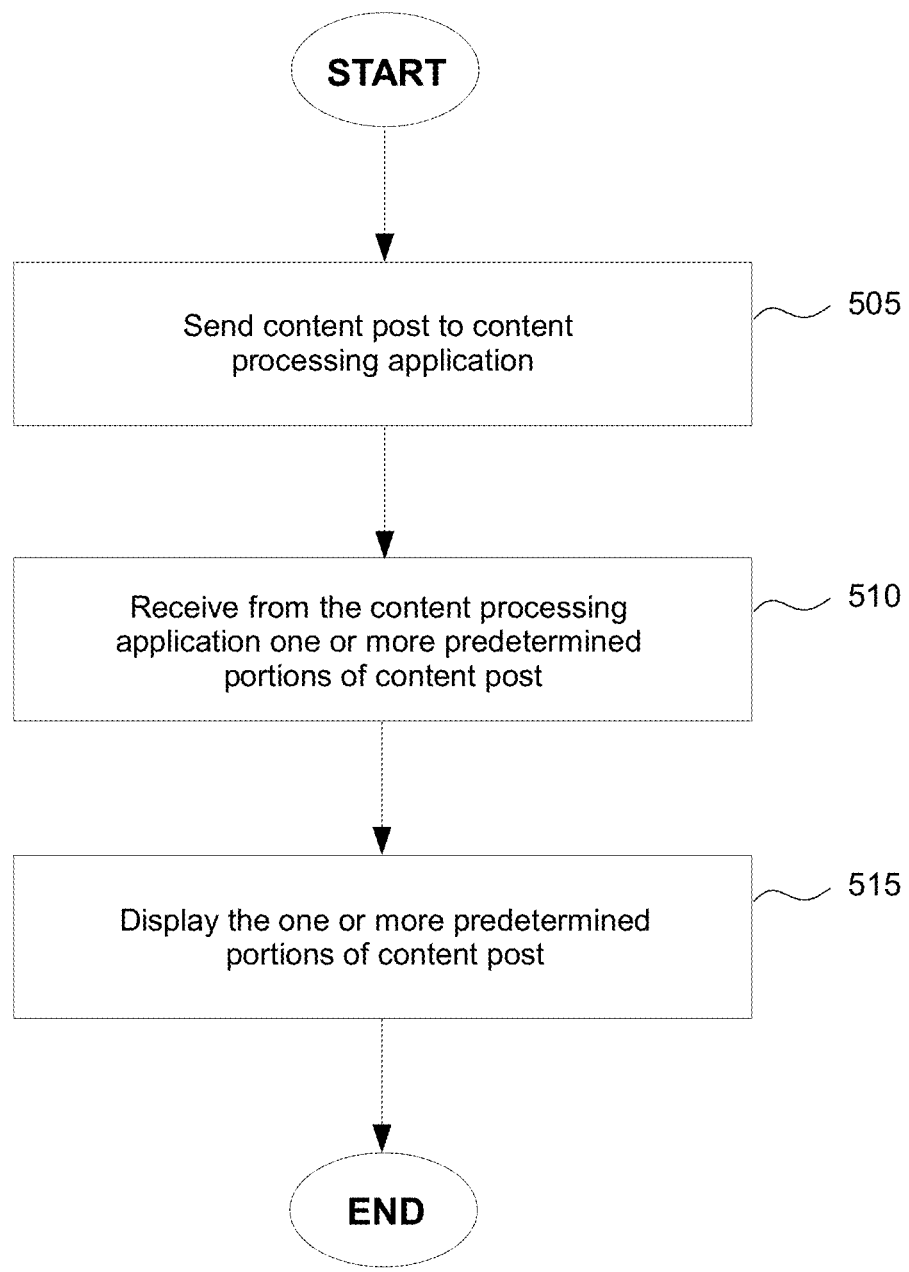
FIG. 5 illustrates a method of requesting a selection of one or more portions of the content post, according to a further embodiment.

Techniques for requesting a selection of one or more portions of the content post are further described herein with respect to FIGS. 3-5. Specifically, as further described herein with respect to FIGS. 3 and 4, the client application may display previously evaluated portions of the content post in order to facilitate portion selection and evaluation by the client. Moreover, as further described herein with respect to FIG. 5, the client application may display predetermined portions of the content post as determined via natural language processing and/or audiovisual processing in order to facilitate portion selection and evaluation. The client application may present the previously evaluated portions or the predetermined portions in the online community interface such that the client may select such previously evaluated portions or predetermined portions for evaluation.

At step 220, upon receiving a client selection of one or more portions and an evaluation of the selected one or more portions, the client application may update display of the content post to reflect the evaluation of the selected one or more portions. According to an embodiment in which a favorability score is selected, the client application may determine respective average favorability scores for each of the selected one or more portions based on the client evaluation. Specifically, the client application may average the favorability score provided for a respective selected portion in the client evaluation with any favorability scores previously provided for the portion in evaluations submitted by other participants in the online community.

Furthermore, according to such embodiment, the client application may display in the online community interface indicia reflecting the respective average favorability scores determined for the selected one or more portions. Such indicia may include one or more of colors, levels of highlighting, levels of shading, border sizes, and levels of underlining corresponding to respective favorability scores or favorability score ranges on a predefined scale. For instance, given the aforementioned predefined scale having five scores, the client application may present in the online community interface a first selected portion of the content post having a favorability score of "0" (indicating lowest favorability) with a designated color, level of highlighting, level of shading, border size, and/or level of underlining, and the client application may present a second selected portion of the content post having a favorability score of "5" (indicating highest favorability) with a distinct designated color, level of highlighting, level of shading, border size, and/or level of underlining. Specifically, the first selected portion having a favorability score of "0" may be shaded in a relatively light color, while the second selected portion having a favorability score of "5" may be shaded in a relatively dark color.

According to a further embodiment in which a favorability score is selected, the client application may determine a total average favorability score for the content post based on the client evaluation. Specifically, the client application may determine the total average favorability score by averaging the respective average favorability scores determined for each of the selected one or more portions. In determining the total average favorability score, the client application may apply a weight to the respective average favorability score of each of the selected one or more portions based on the number of evaluations received for the portion. Accordingly, in determining the total average favorability score the client application may allot additional consideration to portions evaluated relatively more frequently. Furthermore, according to such embodiment, the client application may display in the online community interface the total average favorability score determined for the content post.

FIG. 3 illustrates a method 300 of requesting a selection of one or more portions of the content post, according to an embodiment. The method 300 provides a further embodiment with respect to step 215 of the method 200. According to such embodiment, the online community interface may include an option to display previously evaluated portions of the content post and an option to display previous evaluation attributes.

The method 300 may begin at step 305, where the client application may determine whether the option in the online community interface to display previously evaluated portions of the content post has been selected. Upon determining that the option to display previously evaluated portions of the content post has been selected, at step 310 the client application may display one or more previously evaluated portions (e.g., portions previously selected by one or more online community participants), including indicia reflecting respective previous average favorability scores for the one or more previously evaluated portions. In the context of this disclosure, a previous average favorability score is an average favorability score as determined from all previous evaluations of a previously evaluated portion. The indicia may include at least one type of the indicia previously discussed with respect to the method 200.

At step 315, the client application may determine whether the option in the online community interface to display previous evaluation attributes has been selected. Upon determining that the option to display previous evaluation attributes has been selected, at step 320 the client application may display in the online community interface attributes regarding evaluations of online community participants with respect to at least one of the one or more previously evaluated portions. More specifically, the client application may present a previous average favorability score for a respective previously evaluated portion. Furthermore, the client application may present a quantity of online community participants who assigned a particular favorability score to a respective previously evaluated portion. Additionally, the client application may present the identities of online community participants who assigned a particular favorability score to a respective previously evaluated portion.

FIG. 4 illustrates a method 400 of requesting a selection of one or more portions of the content post, according to an embodiment. The method 400 provides a further embodiment with respect to step 215 of the method 200. According to such embodiment, the online community interface may include an option to display previously evaluated portions of the content post and an option to display only previously evaluated portions having a previous average favorability score greater than a designated value.

The method 400 may begin at step 405, where the client application may determine whether the option in the online community interface to display previously evaluated portions of the content post has been selected. Upon determining that the option to display previously evaluated portions of the content post has been selected, at step 410 the client application may display one or more previously evaluated portions, including indicia reflecting respective previous average favorability scores for the one or more previously evaluated portions. The indicia may include at least one type of the indicia previously discussed with respect to the method 200.

At step 415, the client application may determine whether the option in the online community interface to display only previously evaluated portions having a previous average favorability score greater than a designated value has been selected. Upon determining that such option has been selected, at step 420 the client application may modify display of the one or more previously evaluated portions to present only the previously evaluated portions having a previous average favorability score greater than the designated value.

FIG. 5 illustrates a method 500 of requesting a selection of one or more portions of the content post, according to an embodiment. The method 500 provides a further embodiment with respect to step 215 of the method 200. The method 500 may begin at step 505, where the client application may send the content post to a content processing application. In the context of this disclosure, a content processing application is an application having a capability to predetermine one or more portions of a content post. In the context of this disclosure, a predetermined portion of a content post is a portion that is identified prior to being selected by any online community participant.

In an embodiment, the content processing application to which the content post is sent at step 505 may be a server application (e.g., server application 149 of server system 135). The client application may send the content post to the server application via a network (e.g., network 165). According to such embodiment, the server application may send any textual element in the content post to a NLP application (e.g., NLP application 151). The NLP application may parse and process each language element within such textual element expressing a complete thought (e.g., an n-gram) and may generate content portion data (e.g., content portion data 159). For instance, each language element expressing a complete thought may be processed as a portion. Additionally, the server application may send any audiovisual element in the content post to an audiovisual processing application (e.g., audiovisual processing application 153). The audiovisual processing application may transcribe audio or video data from such audiovisual element into text and subsequently may send the transcribed text to the NLP application for further processing. Additionally or alternatively, the audiovisual processing application may process any audiovisual element to directly generate content portion data for each language element therein expressing a complete thought. The NLP application and/or the audiovisual processing application may transmit generated content portion data to the server application, which may identify one or more predetermined portions of the content post based on the content portion data.

At step 510, the client application may receive from the content processing application one or more predetermined portions of the content post (e.g., the one or more predetermined portions identified by the server application in the aforementioned embodiment). At step 515, the client application may display the one or more predetermined portions of the content post in the online community interface. In an embodiment, the client application may present indicia to distinguish the predetermined portions in the online community interface. The indicia may include at least one of the indicia types previously discussed with respect to the method 200. In an embodiment, the online community interface may include an option to display the one or more predetermined portions, such that the client may determine when or if they are displayed.

According to an embodiment, the steps of the methods 200-500 may be carried out by the server application on the server system (e.g., server application 149) or an application of another computing system rather than the client application on the client computing system. For instance, if the client computing system is a thin client, all processing may occur at the server system, and relevant data required for display of the client online community interface may be sent to the client computing system via the network.

Figure 6:
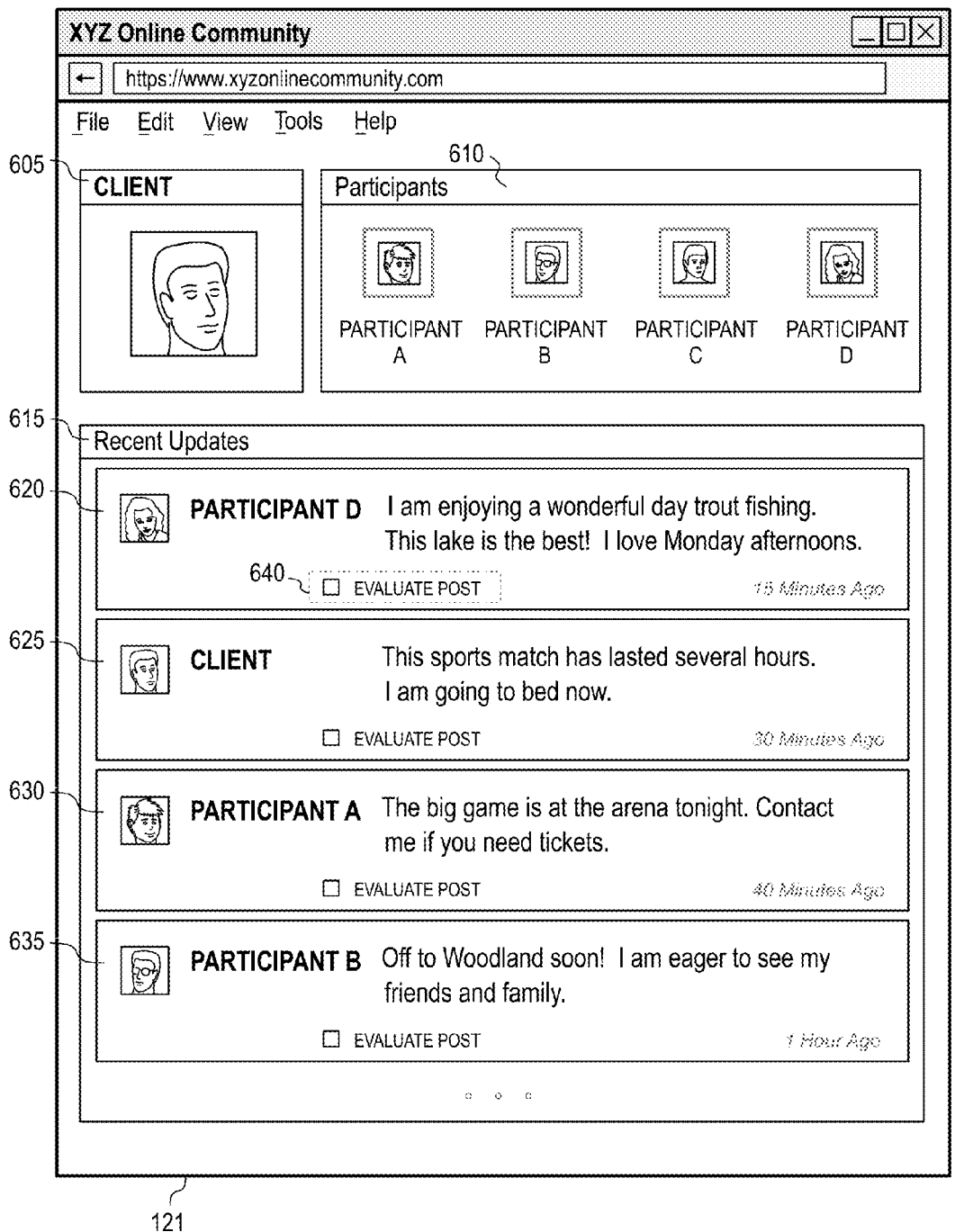
FIG. 6 illustrates a client online community interface, according to an embodiment.

FIG. 6 illustrates online community interface 121 as presented by client application 119 running in memory 107 of client computing system 105, according to an embodiment. Online community interface 121 may include a client identification section 605, a participant identification section 610, and an activity stream 615. Participant identification section 610 may include all or a subset of participants associated with the client within client application 119. As shown, client identification section 605 includes a profile identifier in the form of a thumbnail image for the client, and participant identification section 610 includes respective profile identifiers in the form of thumbnail images for Participant A, Participant B, Participant C, and Participant D. Activity stream 615 may display recent activity stream updates associated with the client and the participants included in participant identification section 610. Activity stream 615 may include activity stream updates in temporal order, with the newest activity stream update at the top. As shown in FIG. 6, Participant D has posted activity stream update 620, the client has posted activity stream update 625, Participant A has posted activity stream update 630, and Participant B has posted activity stream update 635. Each activity stream update may include an option 640 to evaluate the content post within the update.

FIGS. 7-12 illustrate an example scenario of evaluating portions of a content post. More specifically, in this example scenario, the content post of activity stream update 620 of Participant D is evaluated according to the methods 200, 300, and 400. As illustrated in each of FIGS. 7-12, online community interface 121 displays the content post of activity stream update 620 according to step 205 of the method 200.

Figure 7:
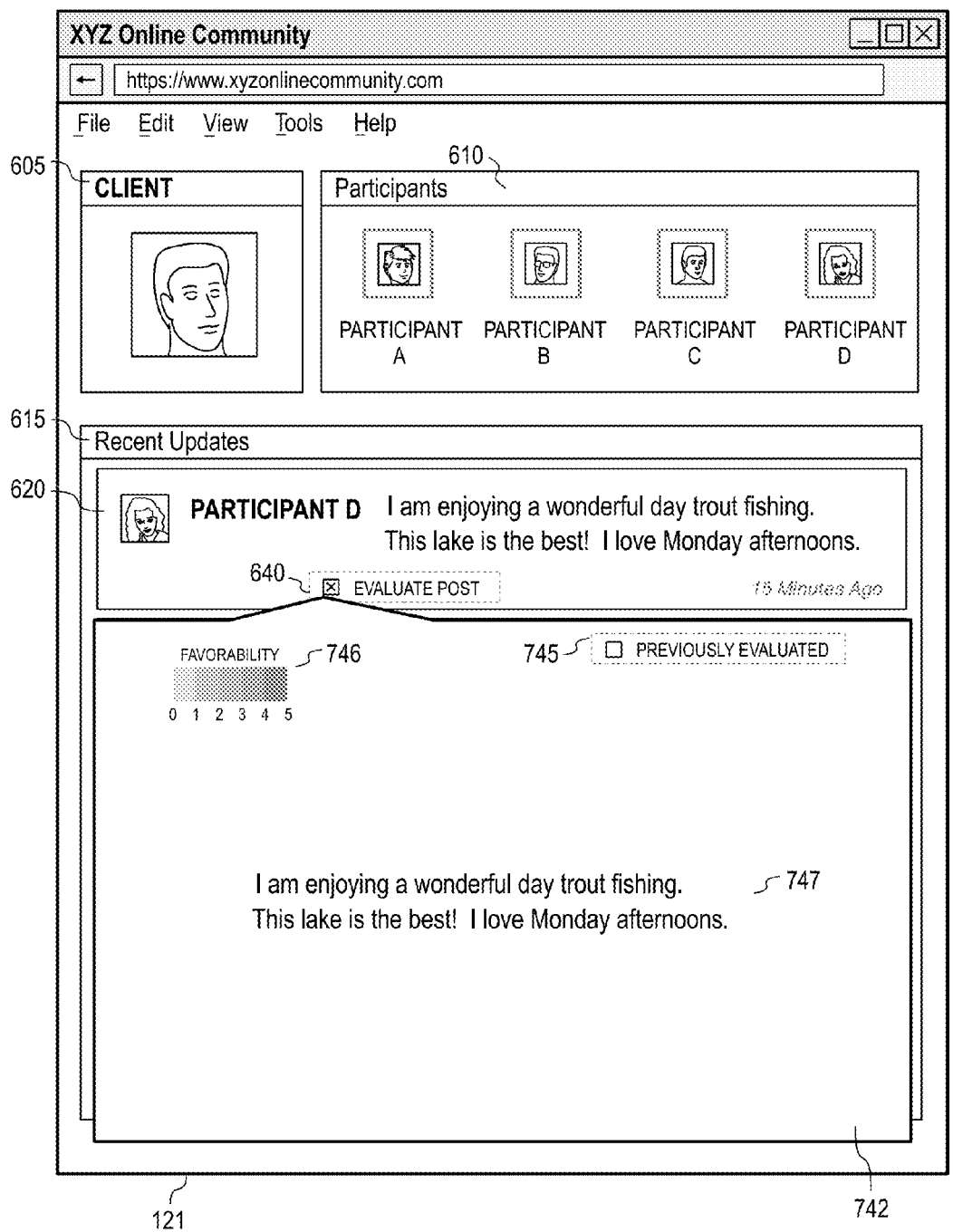
FIG. 7 illustrates an example scenario of evaluating portions of a content post in the online community interface illustrated in FIG. 6, according to an embodiment.

FIG. 7 illustrates online community interface 121 upon selection of the option 640 by the client. Specifically, according to step 210 of the method 200, client application 119 may determine that the option 640 to evaluate the content post of activity stream update 620 has been selected. Hence, according to step 215, client application 119 may request a selection of one or more portions of the content post of activity stream update 620 by presenting a dialog box 742. Dialog box 742 may include a predefined scale 746 having six favorability values. For purposes of this example scenario, a score of "0" according to predefined scale 746 is assumed to indicate lowest favorability, a score of "1" is assumed to indicate low favorability, a score of "2" is assumed to indicate moderately low to neutral favorability, a score of "3" is assumed to indicate neutral to moderately high favorability, a score of "4" is assumed to indicate high favorability, and a score of "5" is assumed to indicate highest favorability. Dialog box 742 additionally includes a representation 747 of the content post of activity stream update 620. In this example scenario, the client may select one or more portions of representation 747 (e.g., by highlighting each respective portion), at which time client application 119 may request evaluation of the selected one or more portions. Dialog box 742 further includes an option 745 to display previously evaluated portions of the content post to facilitate client portion selection.

Figure 8:
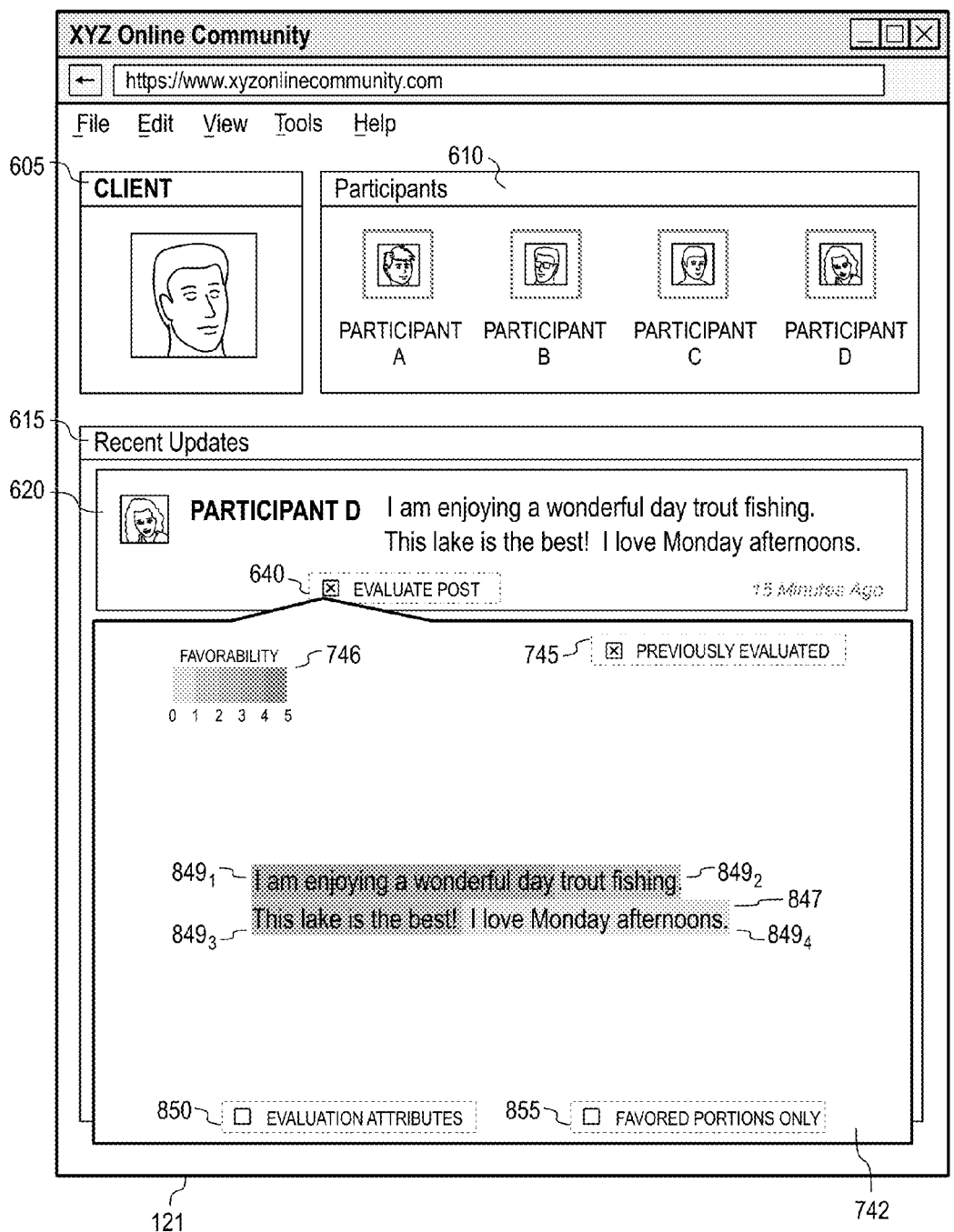
FIG. 8 illustrates an example scenario of evaluating portions of a content post in the online community interface illustrated in FIG. 6, in which one or more previously evaluated portions are displayed, according to an embodiment.

FIG. 8 illustrates online community interface 121 upon selection of option 745 by the client. Specifically, according to step 305 of the method 300 or step 405 of the method 400, client application 119 may determine that the option 745 to evaluate the content post of activity stream update 620 has been selected. Hence, according to step 310 or step 410, client application 119 may display in dialog box 742 a representation 847 of the content post of activity stream update 620 including previously evaluated portions $849_1$, $849_2$, $849_3$, and $849_4$, the attributes of which are assumed for purposes of this example scenario. Previously evaluated portions $849_1$, $849_2$, $849_3$, and $849_4$ include respective color indicia reflecting the values of respective previous average favorability scores (e.g., respective average favorability scores determined from all previous evaluations of the participants included in participant identification section 610). Dialog box 742 as illustrated in FIG. 8 additionally includes an option 850 to display previous evaluation attributes (in accordance with the method 300) and an option 855 to display only previously evaluated portions having a previous average favorability score greater than a designated value (in accordance with the method 400).

Figure 9:
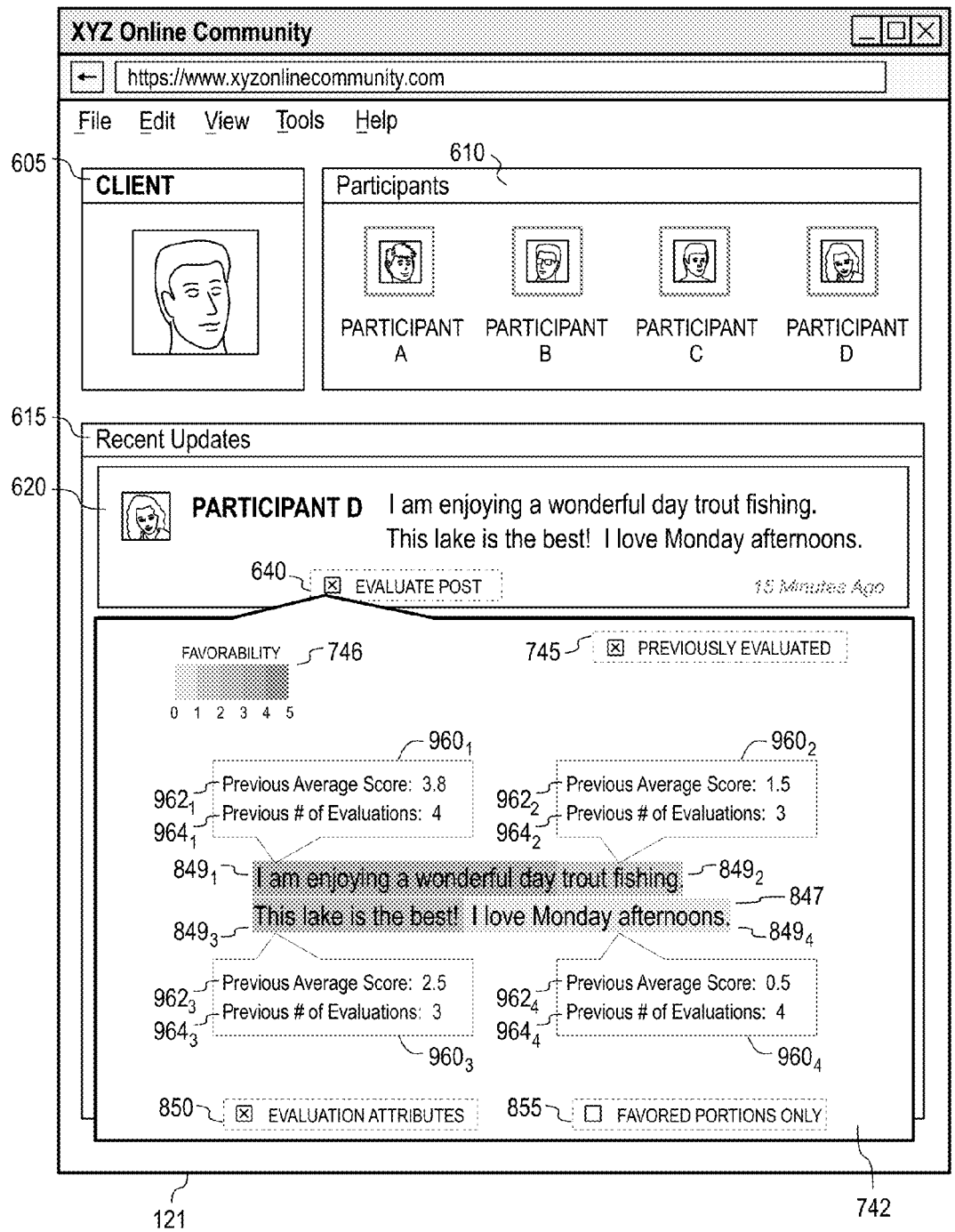
FIG. 9 illustrates an example scenario of evaluating portions of a content post in the online community interface illustrated in FIG. 6, in which one or more previously evaluated portions and corresponding evaluation attributes are displayed, according to an embodiment.

FIG. 9 illustrates online community interface 121 upon selection of the option 850. Specifically, according to step 315, client application 119 may determine that the option 850 to display previous evaluation attributes has been selected. Hence, according to step 320, client application 119 may display in dialog box 742 previous evaluation attribute sets $960_1$, $960_2$, $960_3$, and $960_4$ for respective previously evaluated portions $849_1$, $849_2$, $849_3$, and $849_4$ of the content post in representation 847. Each previous evaluation attribute set 960 may include a previous average favorability score 962 and a number of previous evaluations 964 for each respective previously evaluated portion 849.

Figure 10:
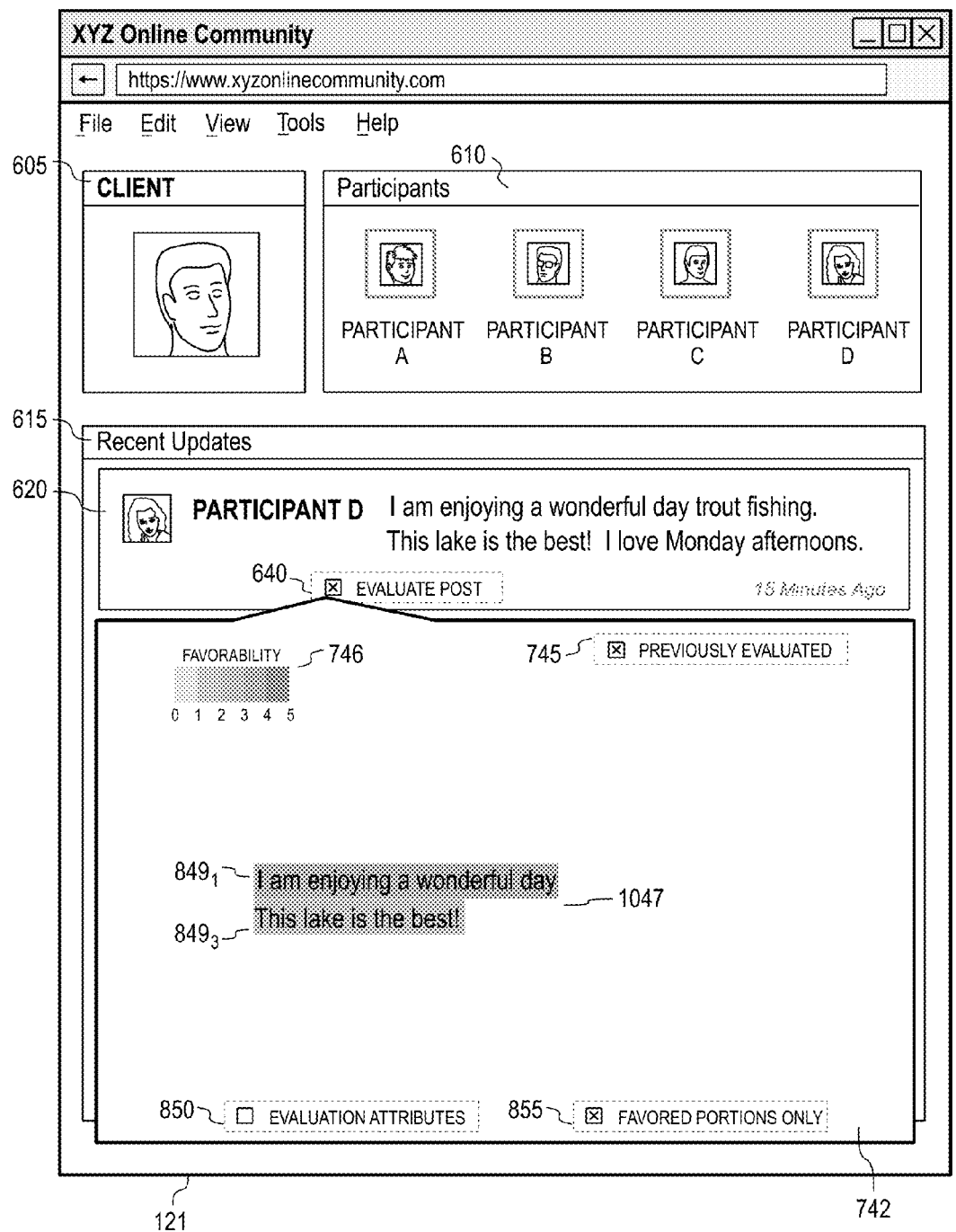
FIG. 10 illustrates an example scenario of evaluating portions of a content post in the online community interface illustrated in FIG. 6, in which only previously evaluated portions having a previous average favorability score greater than a designated value are displayed, according to an embodiment.

FIG. 10 illustrates online community interface 121 upon selection of the option 855. Specifically, according to step 415, client application 119 may determine that the option 855 to display only previously evaluated portions of the content post having a previous average favorability score greater than a designated value has been selected. Assuming that purposes of this example scenario that the designated value is 2, according to step 420, client application 119 may display in dialog box 742 a representation 1047 of the content post of activity stream update 620 including only previously evaluated portions $849_1$ and $849_3$, which each have a previous average favorability score 962 greater than the designated value of 2. Since previously evaluated portions $849_2$ and $849_4$ each have a previous average favorability score 962 less than the designated value of 2, they are not displayed in representation 1047.

Figure 11:
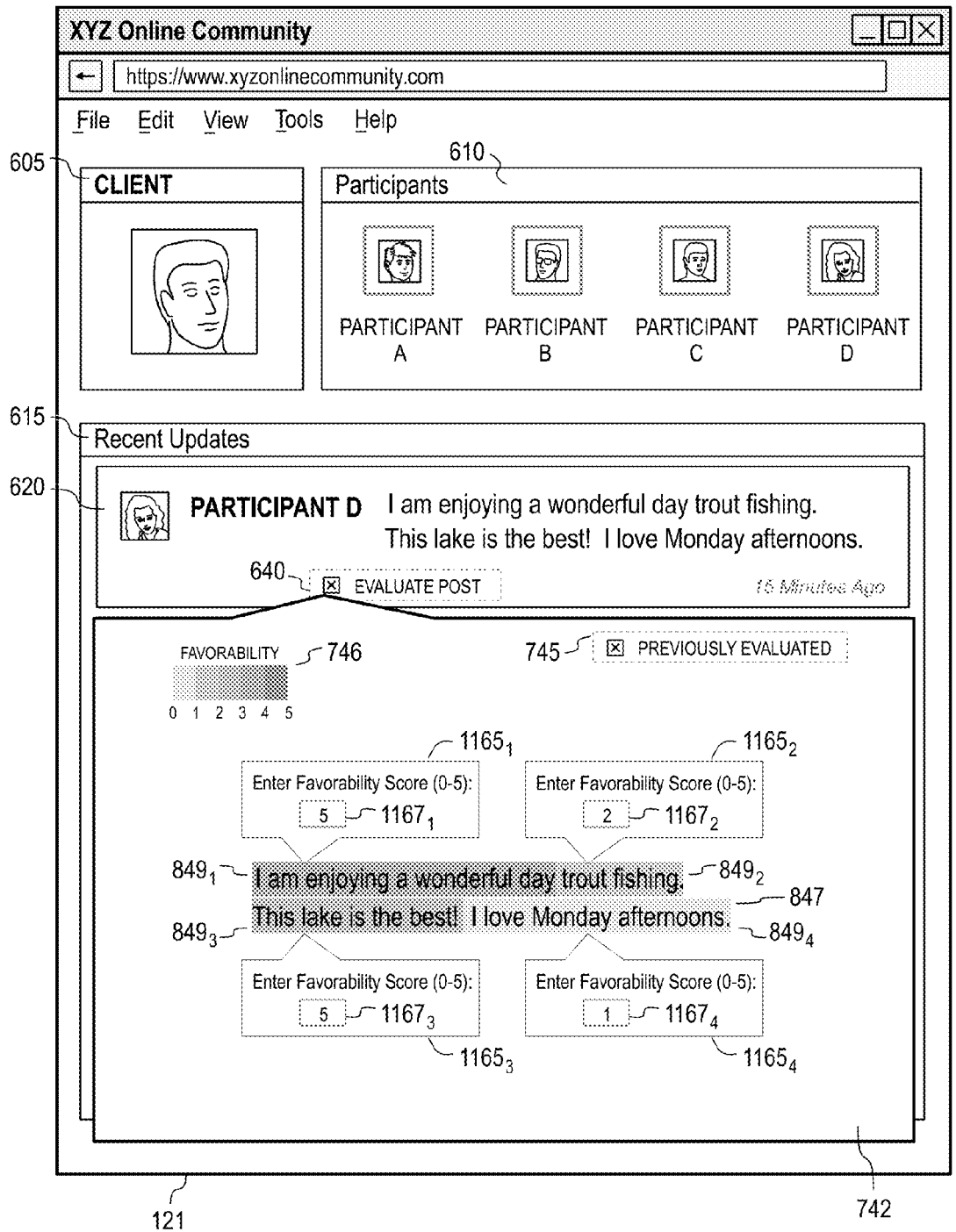
FIG. 11 illustrates an example scenario of evaluating portions of a content post in the online community interface illustrated in FIG. 6, in which evaluations for one or more selected portions are provided by a client, according to an embodiment.

FIG. 11 illustrates online community interface 121 upon evaluation by the client of each previously evaluated portion 849 in representation 847. Specifically, client application 119 may enable the client to select (e.g., highlight) previously evaluated portions $849_1$, $849_2$, $849_3$, and $849_4$. Upon receiving a selection by the client of previously evaluated portions $849_1$, $849_2$, $849_3$, and $849_4$ in accordance with step 220, client application 119 may provide respective dialog boxes $1165_1$, $1165_2$, $1165_3$, and $1165_4$ for receiving a client evaluation. As illustrated, the client may provide respective evaluations $1167_1$, $1167_2$, $1167_3$, and $1167_4$ in the form of favorability scores for respective previously evaluated portions $849_1$, $849_2$, $849_3$, and $849_4$. In an embodiment, client application 119 may tally an evaluation 1167 immediately upon entry by the client. In a further embodiment, client application 119 may provide an option in online community interface 121 to submit the evaluations 1167 (such option is not shown in FIG. 11). Consequent to one or both of these embodiments, client application 119 may receive client evaluations $1167_1$, $1167_2$, $1167_3$, and $1167_4$.

Figure 12:
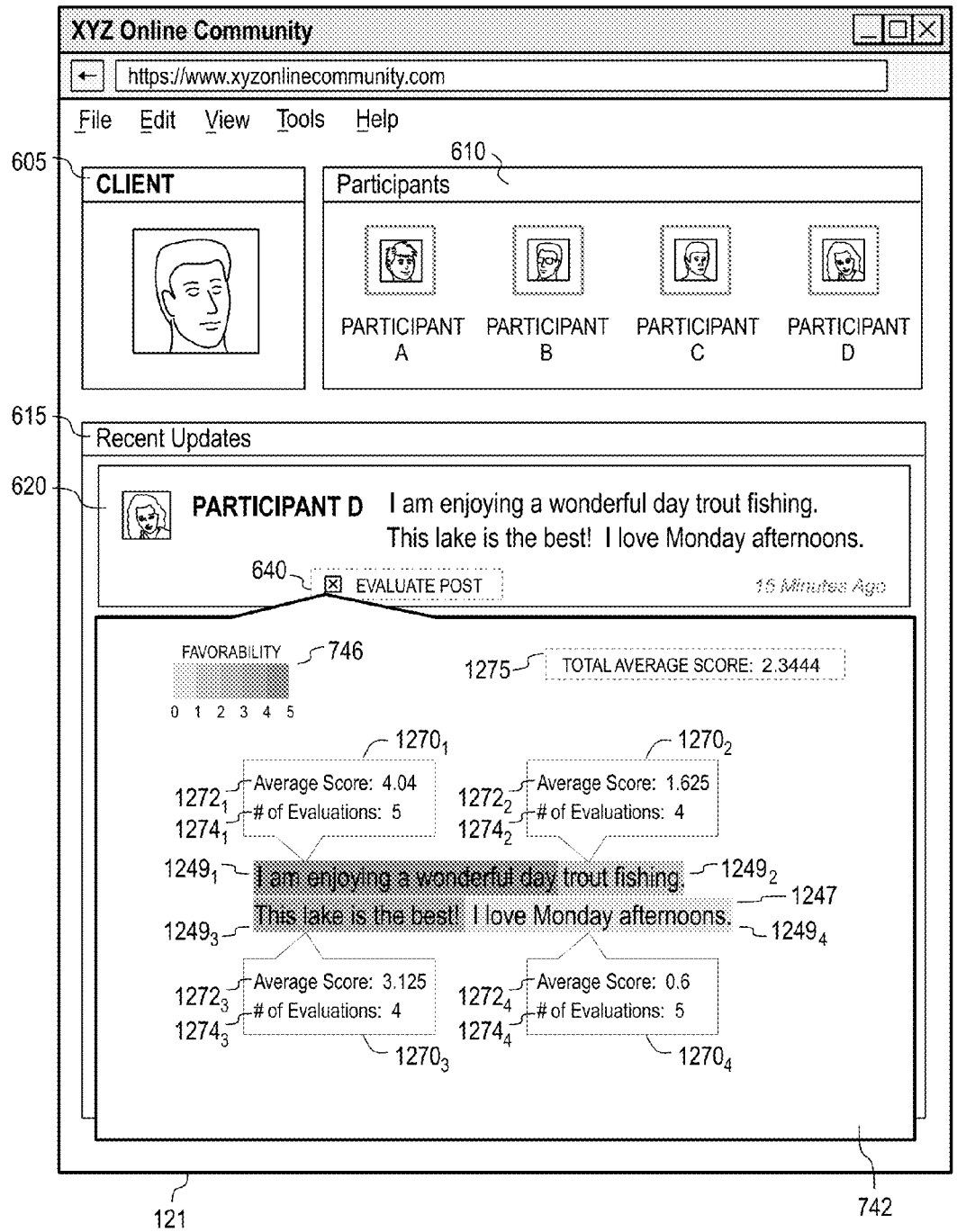
FIG. 12 illustrates an example scenario of evaluating portions of a content post in the online community interface illustrated in FIG. 6, in which display of the content post has been updated to reflect a client evaluation, according to an embodiment.

FIG. 12 illustrates online community interface 121 upon update of the display of the content post of activity stream update 620 to reflect the client evaluation of portions of the content post. Specifically, client application 119 may update display of the content post according to step 220 by including representation 1247 in dialog box 742. Representation 1247 includes portions $1249_1$, $1249_2$, $1249_3$, and $1249_4$ of the content post selected and evaluated by the client. Portions $1249_1$, $1249_2$, $1249_3$, and $1249_4$ include updated respective color indicia reflecting respective average favorability scores reflecting both previous evaluations and respective client evaluations $1167_1$, $1167_2$, $1167_3$, and $1167_4$. Additionally, client application 119 may display in dialog box 742 evaluation attribute sets $1270_1$, $1270_2$, $1270_3$, and $1270_4$ for respective portions $1249_1$, $1249_2$, $1249_3$, and $1249_4$. Each evaluation attribute set 1270 may include an average favorability score 1272 and a number of evaluations 1274 for each portion 1249 in representation 1247. Each evaluation attribute set 1270 reflects both previous evaluations and client evaluations $1167_1$, $1167_2$, $1167_3$, and $1167_4$. Accordingly, the number of evaluations 1274 for a respective portion 1249 in this example scenario reflects the previous number of evaluations 964 for the portion along with the client evaluation 1167 of the portion.

Client application 119 may obtain the average favorability score 1272 for each respective portion 1249 in representation 1247 by averaging the favorability scores previously provided for the respective selected portion with the favorability score provided by the client. Specifically, given that the previously provided favorability scores for a respective portion are collectively represented by a previous average favorability score 962 in this example scenario, as illustrated in FIG. 9, the respective previous average favorability score 962 for such portion may be re-averaged with the favorability score provided by the client via respective evaluation 1167, as illustrated in FIG. 11. Accordingly, in general terms, client application 119 may determine a respective average favorability score 1272 as follows:

Average favorability score 1272=[(prev. # of evaluations*previous average favorability score)+client evaluation]/# of evaluations Specifically, client application 119 may determine average favorability scores $1272_1$, $1272_2$, $1272_3$, and $1272_4$ as follows:

Average favorability score $1272_1$=[(4*3.8)+5]/5=4.04

Average favorability score $1272_2$=[(3*1.5)+2]/4=1.625

Average favorability score $1272_3$=[(3*2.5)+5]/4=3.125

Average favorability score $1272_4$=[(4*0.5)+1]/5=0.6

Furthermore, client application 119 may display in dialog box 742 a total average favorability score 1275. Client application 119 may determine the total average favorability score 1275 by averaging the respective average favorability scores $1272_1$, $1272_2$, $1272_3$, and $1272_4$ determined for respective selected portions $1249_k$, $1249_2$, $1249_3$, and $1249_4$ in representation 1247. In determining the total average favorability score 1275, client application 119 may apply a weight to the average favorability score 1272 of each of the portions 1249 in representation 1247 based on the number of evaluations 1274 received for such portion. Accordingly, based on the information in evaluation attribute sets $1270_1$, $1270_2$, $1270_3$, and $1270_4$, client application 119 may determine total average favorability score 1275 as follows:

Total average favorability score 1275=(5*4.04)+(4*1.625)+(4*3.125)+(5*0.6)=2.3444.

According to the various embodiments described herein, a client application may permit separate and distinct evaluation of portions of a content post such that a client may attribute favor, neutrality, and/or disfavor to one or more portions within the same post. Accordingly, the various embodiments may ensure more accurate evaluations of content posts and further may encourage online community participants to evaluate content posts having multiple aspects.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
    displaying a content post in an online community interface; and
    upon detecting a selection of an option in the online community interface to evaluate the content post:
        requesting a selection of at least one portion of the content post by displaying in the online community interface favorability score indicia for at least one previously evaluated portion of the content post having a previous average favorability score greater than a designated value or by displaying in the online community interface at least one predetermined portion of the content post, wherein the at least one predetermined portion of the content post is identified based upon content portion data generated via a natural language processing application or an audiovisual processing application that processes each language element expressing a complete thought within the content post;
        requesting an evaluation of the selected at least one portion of the content post by requesting selection of a favorability score on a predefined scale for each of the selected at least one portion of the content post; and
        upon receiving the selected at least one portion of the content post and the evaluation thereof, updating display of the content post to reflect the evaluation.

2. The method of claim 1, wherein updating display of the content post to reflect the evaluation comprises:
    determining respective average favorability scores for each of the selected at least one portion of the content post based on the evaluation; and
    displaying in the online community interface indicia reflecting the respective average favorability scores determined for the selected at least one portion of the content post.

3. The method of claim 1, wherein updating display of the content post to reflect the evaluation comprises:
    determining a total average favorability score for the content post based on the evaluation; and
    displaying in the online community interface the total average favorability score determined for the content post.

4. The method of claim 3, wherein determining the total average favorability score for the content post comprises averaging respective average favorability scores determined for each of the selected at least one portion of the content post based on the evaluation.

5. The method of claim 4, wherein determining the total average favorability score for the content post further comprises applying a weight to the respective average favorability score determined for each portion of the selected at least one portion based on a number of evaluations received for the portion.

6. The method of claim 1, wherein requesting a selection of at least one portion of the content post further comprises, upon detecting selection of an option in the online community interface to display previous evaluation attributes, displaying attributes regarding evaluations of online community participants with respect to at least one portion among the at least one previously evaluated portion of the content post.

7. The method of claim 6, wherein the displayed attributes include a quantity of online community participants who assigned a particular favorability score to a respective previously evaluated portion.

8. The method of claim 6, wherein the displayed attributes include identities of online community participants who assigned a particular favorability score to a respective previously evaluated portion.

9. The method of claim 1, wherein requesting a selection of at least one portion of the content post further comprises:
    sending the content post to a content processing application; and
    receiving from the content processing application the at least one predetermined portion of the content post.

10. The method of claim 1, wherein the online community includes at least one of (i) a discussion forum, (ii) a social network, (iii) a product marketplace, and (iv) a weblog.

11. The method of claim 1, wherein the content post includes at least one of (i) a textual element, (ii) a photograph, and (iii) an audiovisual element.

12. The method of claim 1, wherein the natural language processing application parses a textual element of the content post.

13. The method of claim 1, wherein the audiovisual processing application processes an audiovisual element of the content post.

\* \* \* \* \*